Figure 1A:
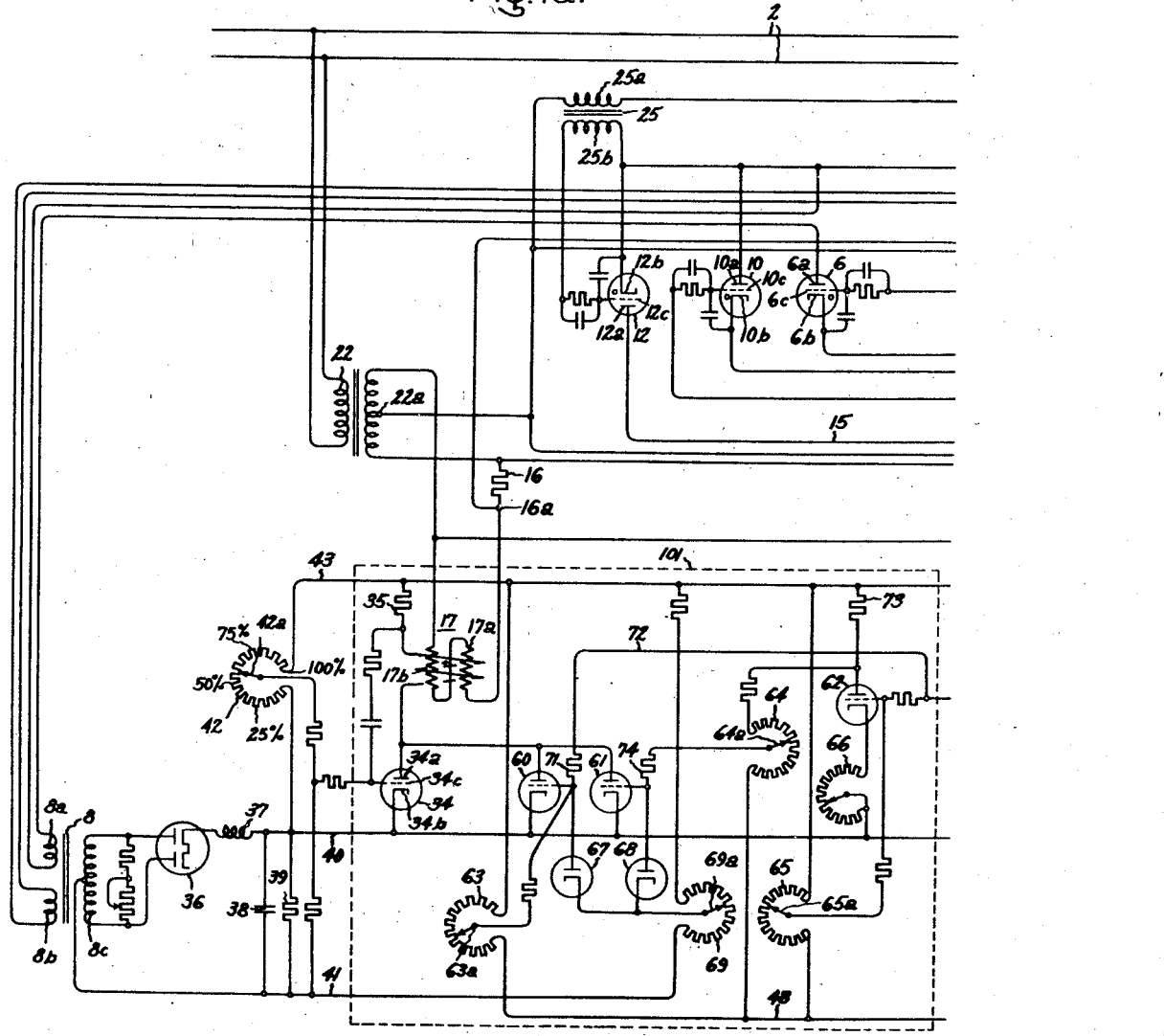

Inventor:
Orrin W. Livingston,
by /s/ ———
His Attorney.

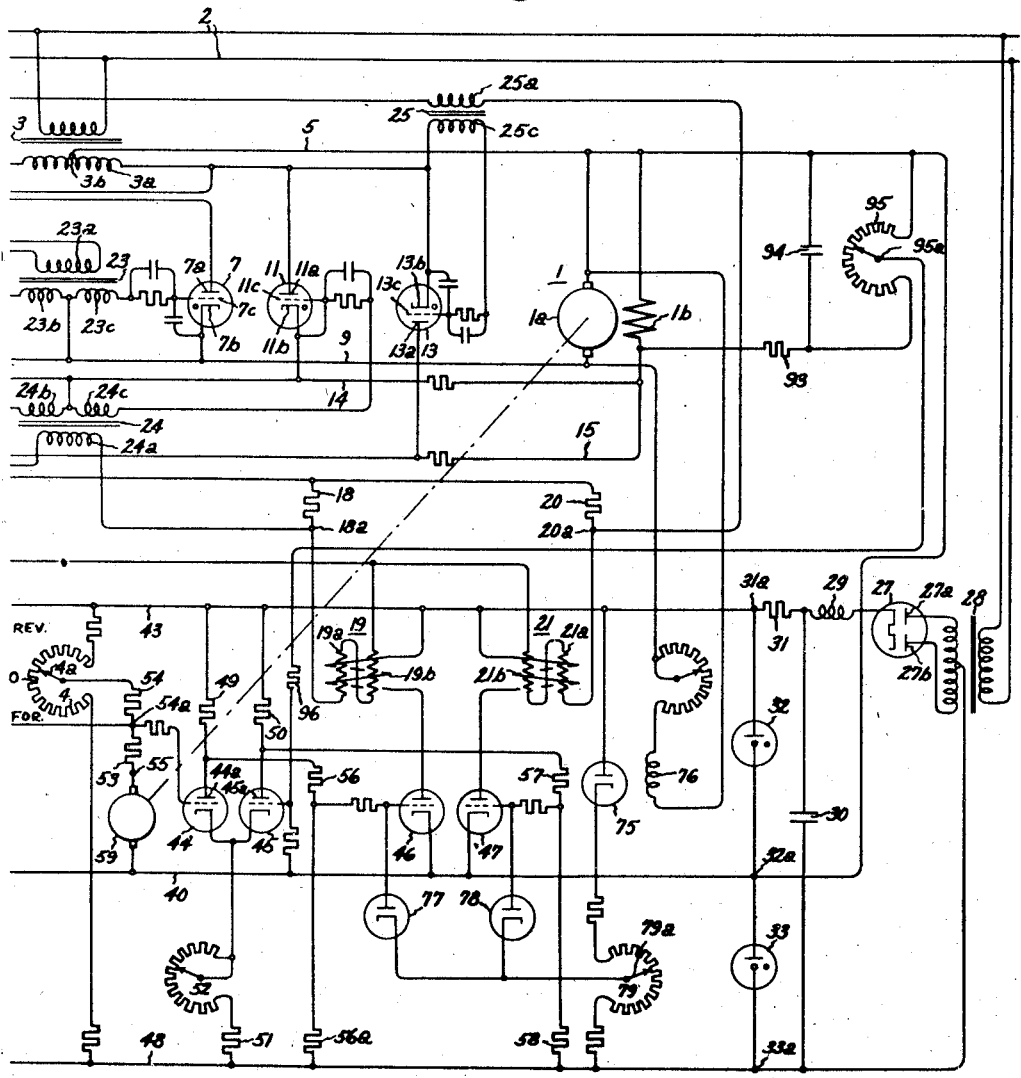

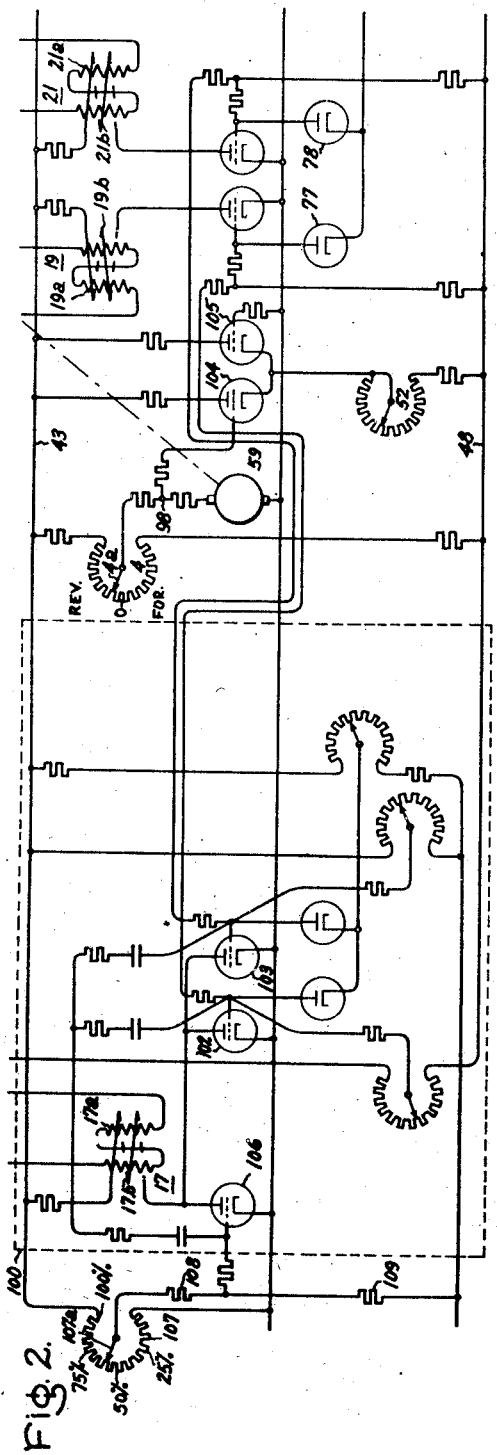

Patented June 3, 1947

2,421,632

UNITED STATES PATENT OFFICE 2,421,632

APPARATUS FOR CONTROLLING ELECTRIC MOTORS

Orrin W. Livingston, Scotia, N. Y., assignor to General Electric Company, a corporation of New York Application June 16, 1945, Serial No. 599,911

22 Claims. (Cl. 172—239)

This invention relates to apparatus for controlling electric motors, and it has for an object the provision of a simple, reliable, and improved control apparatus of this character.

More particularly, the invention relates to motor control apparatus in which the armature is supplied from a single electric valve type rectifying equipment. Since a single control rectifying equipment can conduct current in only one direction, control apparatus of this character has not been suitable for use with motors which in their operation may be required to produce a negative torque to brake an overhauling load. Accordingly, a further object of this invention is the provision of motor control apparatus in which the armature is supplied from a single electric valve type rectifying equipment and in which the torque of the motor may be continuously varied from a maximum positive value to a maximum negative value without reversing the armature current.

A further object of the invention is the provision of a motor control apparatus of this character in which the rectifier is controlled to operate as an inverter to effect retardation of the motor when the motor is decelerated from a high speed to a lower speed, or when the motor is overhauled by its load.

This application is a continuation in part of application Serial No. 568,585 for Motor control apparatus, filed December 18, 1944, and assigned to the same assignee.

In carrying the invention into effect in one form thereof, a single controlled electric valve type rectifying equipment is provided for supplying current to the armature of the motor. Regulating means responsive to the armature current are provided for controlling the rectifier to maintain the armature current constant. A controlled electric valve rectifier is provided for supplying current in one direction to the field winding to cause the motor to produce a positive torque, and a second controlled electric valve rectifier is provided for supplying current in the reverse direction to the field winding to cause the motor to produce a negative torque.

Means are provided for producing a signal voltage which bears a predetermined relationship to some operating characteristic such as the voltage supplied to the armature or to the field winding, the current in the field winding, the speed of the motor, or the tension of a length of material upon which some operation is being performed. A source of adjustable reference voltage is provided, and the signal voltage is compared with this reference voltage. Means responsive to the polarity of the difference of the signal and reference voltages are provided for selectively energizing the forward and reverse field rectifiers and for controlling the energized rectifier in response to the magnitude of the difference voltage.

For the purpose of increasing the torque for short periods of time, such as during periods of acceleration and deceleration, means responsive to the difference of the signal and reference voltages are provided for controlling the armature rectifier to force the armature current to exceed its rated value. Preferably, the control is arranged so that the armature forcing action is not initiated until the field current has attained full rated value.

The current regulator for the armature rectifier may be set to hold full rated armature current or any fraction thereof.

In a modification, the current regulator is omitted, and the armature rectifier is controlled entirely from the armature current forcing control means in response to the difference between the signal and reference voltages. This modification may be considered the limiting case of the modification in which the adjustable current regulator is provided; i. e., it may be considered to be the case in which the current regulator is adjusted to hold zero armature current.

Suitable voltage and current limiting means may be provided for preventing excessive armature voltages and currents.

Figure 4:
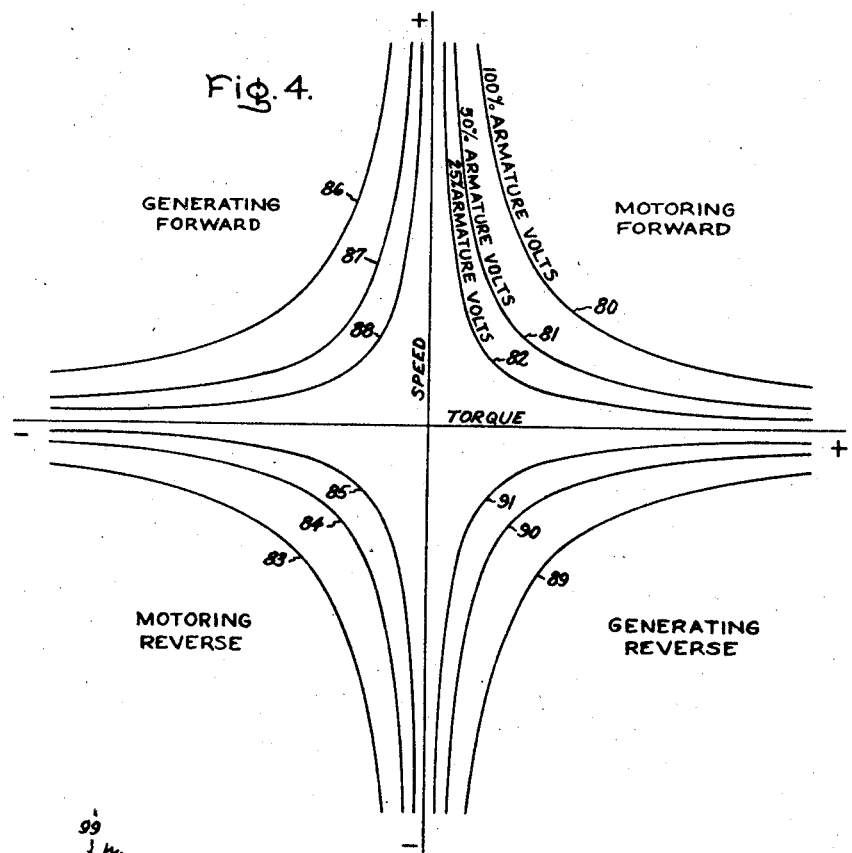
Figure 5:
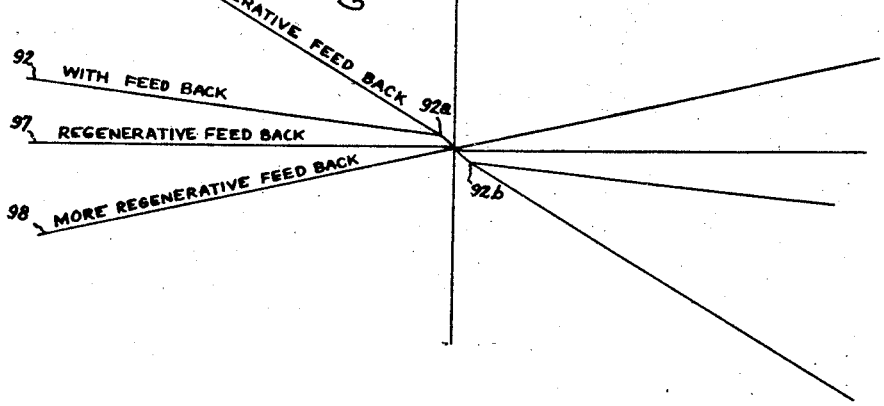

For a better and more complete understanding of the invention, reference should now be had to the following specification and to the accompanying drawing of which Fig. 1 is a simple, diagrammatic sketch of an embodiment of the invention; Figs. 2 and 3 are simple, schematic diagrams of modifications; and Figs. 4 and 5 are charts of characteristic curves which serve to facilitate an understanding of the invention.

Referring now to the drawing, an electric motor 1 having an armature 1a and a shunt field winding 1b is supplied from a source of alternating voltage 2 through a supply transformer 3 and a suitable controlled rectifying equipment.

The speed and direction of rotation of the motor are under the control of a suitable controlling accessory which is illustrated as a speed controlling rheostat 4. A push-button control station for controlling the starting and stopping of the motor is optional equipment. However, since such push-button control stations are conventional and since the starting and stopping of the motor may be effected by the speed controlling rheostat, such push-button control station is omitted from the drawing in interest of simplicity.

The secondary winding 3a of the supply transformer 3 is provided with a center tap 3b and this center tap is connected to the bus 5 which therefore becomes the negative terminal of the direct current system, i. e., the negative armature and the negative field terminal.

The current supplied to the armature 1a of the motor is controlled by the single biphase half-wave rectifying equipment which comprises the two electric valves 6 and 7. This rectifier rectifies both halves of the alternating voltage wave. The anodes 6a and 7a are connected through the primary windings 8a and 8b of a special control transformer 8 to the opposite terminals of the secondary winding of the supply transformer 3. The cathodes 6b and 7b of the valves 6 and 7 are connected to the conductor 9 which thus becomes the positive side of the supply for the armature. Thus the armature circuit is readily traced from the positive conductor 9 through the armature 1a to the negative conductor 5.

The current supplied to the field winding 1b from the source 1 is controlled by two single rectifying equipments. The first rectifying equipment which controls the current supplied to the field winding 1b to produce a positive torque, i. e., a torque which produces rotation of the motor in the forward direction, comprises the two electric valves 10 and 11. The rectifier which controls the supply of current in the reverse direction to produce a negative torque, i. e., a torque which produces rotation in the reverse direction, comprises the two electric valves 12 and 13. As shown, the anodes 10a and 11a of the valves 10 and 11 are connected to the opposite terminals of the secondary winding 3a of the supply transformer 3. The cathodes 10b and 11b of these valves are connected to the conductor 14 which thus becomes the positive terminal of the field supply for the forward direction of rotation. The anodes 12a and 13a of the reverse rectifier for the field are connected to the conductor 15 which thereupon becomes the negative terminal of the field supply for the reverse direction of rotation of the motor. The cathodes 12b and 13b are connected to the opposite terminals of the secondary winding of the supply transformer so that the conductor 5 becomes the positive bus of the field supply for the reverse direction of rotation of the motor.

Although the electric valves 6, 7, 10, 11 and 12, 13 may be of any suitable type, they are preferably grid controlled, mercury vapor thyratron tubes. Their cathodes may be either of the directly heated or indirectly heated type. Preferably, they are of the indirectly heated type as illustrated, and are provided with suitable heating units (not shown). These thyratrons 6, 7, 10, 11, 12 and 13 are provided with control grids 6c, 7c, 10c, 11c, 12c and 13c, respectively. In thyratron valves, the function of the control grid is only to initiate the flow of current between the anode and cathode during each positive half-cycle of anode voltage. Once current has started to flow, the grid exercises no further control until the conductivity of the valve has been interrupted by some means external to the valve itself. Once the current has ceased to flow, the potential of the grid will again determine the point in the positive half-cycle of anode voltage at which the valve will again become conducting. These valves are therefore grid controlled arc rectifiers.

Although the thyratron valves 6, 7, 10, 11, 12, 13 may be controlled by any suitable method, it is preferred to use the method of varying the firing point of the valve during the positive half-cycle of anode voltage. For the carrying out of this method of control, three phase shifting networks, one for the armature thyratrons 6 and 7, and one each for the forward and reverse field thyratrons are provided. The phase shifting network for the armature thyratrons comprises a resistor 16 and the alternating current winding 17a of a saturable core type reactor 17. The network for the forward field thyratrons comprises a resistor 18 and the alternating current winding 19a of a saturable core type reactor 19. Similarly, the network for the reverse field thyratrons comprises a resistor 20 and the alternating current winding 21a of a saturable core type reactor 21. These phase shifting networks are connected in parallel across the terminals of the secondary winding 22 of a low voltage transformer of which the primary winding is supplied from a suitable source such as that represented by the supply line 2. The secondary winding is provided with a center tap 22a. The primary winding 23a of a grid control transformer 23 is connected between the center tap 22a and the junction point 16a of the resistor 16 and the reactor winding 17a. The secondary winding of this grid transformer is divided into two halves 23b and 23c. The half 23b is connected between the grid and cathode of the armature thyratron 6, and similarly, the half 23c is connected between the grid and cathode of the armature thyratron 7. Corresponding grid transformers 24 and 25 are provided for the forward and reverse field thyratrons. The field transformer 24 has a primary winding which is connected between the center tap 22a and the junction point 18a of the resistor 18 and reactor winding 19a. The secondary winding is divided into two halves 24b and 24c which are connected between the cathodes and grids of the forward field thyratrons 10 and 11, respectively. The grid transformer 25 has a primary winding 25a which is connected between the center tap 22a and the junction point 20a of the resistor 20 and reactor winding 21a. This grid transformer has two secondary windings 25b and 25c which are connected between the cathodes and grids of the reverse field thyratrons 12 and 13, respectively. The phase shift of the grid voltages is produced by varying the reactance of the saturable core reactors, which is controlled by varying the D.-C. saturation of these reactors.

The control is such that when the saturable reactors are saturated, the voltages of the grid transformers tend to be in phase with the anode transformer voltage, and when the reactors are unsaturated, the voltages of the grid transformers tend to be out of phase and lagging. Intermediate values of saturation produce corresponding intermediate phase relationships. Thus, when the saturable reactors 17, 19 and 21 are fully saturated, the thyratrons 6, 7, 10, 11, 12 and 13 are fully conducting, and conversely, when the reactors are unsaturated, the thyratrons are nonconducting. For intermediate values of saturation, the thyratrons have corresponding intermediate values of conductivity.

A direct control voltage is derived from the alternating voltage source 2 by means of a small auxiliary biphase half-wave rectifying valve 27 of which the anodes 27a and 27b are connected to opposite terminals of the secondary winding of a transformer 28, of which the primary winding is connected to the source 2. The rectified voltage is filtered by means of a smoothing reactor 29 and a capacitor 30. The voltage across the capacitor 30 is impressed on a circuit comprising a resistor 31 in series with two glow tubes 32 and 33. These glow tubes 32 and 33 are gaseous discharge devices which operate in that region of their characteristics in which the voltage drop across the tube is substantially constant over a wide range of current. The voltage drop across the points 31a and 33a is fixed in magnitude by the type of glow tube used, and within the operating limits of this equipment, this voltage is independent of variations in the alternating current supply voltage. Any difference in voltage between the voltage across the capacitor 30 and the constant voltage across the glow tubes 32 and 33 is absorbed by the resistor 31. The constant voltages across the glow tubes 32 and 33 are used for stabilizing the voltage on the amplifier valves used in the control circuit, and in addition, reference voltages which are used for controlling purposes are also derived from the sum of these voltages.

For the purpose of varying the direct current which flows in the saturating winding 17b, a suitable amplifying electric valve 34 is provided. This valve is provided with an anode 34a, a cathode 34b, and a control grid 34c. The D.-C. winding 17b of the saturable reactor and the valve 34 are connected in series with a resistor 35 across the glow tube 32. The control of the current through the D.-C. winding of the armature saturable reactor 17 is achieved by proper choice of the grid-to-cathode voltage of the valve 34. As the voltage of the grid 34c is made less negative with respect to the voltage of the cathode 34b, the current transmitted by the valve increases, thereby increasing the saturation of the armature saturable reactor 17 which, as pointed out in the foregoing, results in increasing the voltage applied to the armature of the motor 1. Conversely, as the voltage of the grid 34c is made more negative with respect to the voltage of the cathode 34b, the current transmitted by the valve 34 decreases and this decreases the voltage supplied to the armature of the motor.

For the purpose of regulating the armature current, i. e., maintaining the armature current constant at the rated value or some desired fraction thereof, means are provided for comparing a signal voltage derived from the anode current of the armature thyratrons with a reference voltage, and utilizing the difference of these signal and reference voltages to control the armature thyratrons in such a manner as to maintain the armature current constant at the desired value. These means are illustrated as comprising the anode current transformer 8, the biphase rectifying electric valve 36, and a filter comprising the reactance 37 and capacitor 38. As shown, the two primary windings 8a and 8b of the anode current transformer 8 are connected in series with the anode circuits of each of the armature thyratron valves, and this transformer is polarized in such a manner that when one of the armature thyratrons conducts, the flux in the core is in one direction, and when the other thyratron conducts, the flux is reversed. As a result, an alternating voltage is induced across the secondary winding 8c, and the magnitude of this induced voltage is determined by the resistance load connected to the secondary winding and by the turn ratio between the primary and secondary windings. This alternating voltage is rectified by the electric valve 36 and appears as a direct voltage across the resistor 39 and the conductors 40 and 41. The conductor 40, it will be noted, is connected to the junction point 32a of the glow tubes 32 and 33.

An adjustable reference voltage is derived from the voltage across the glow tube 32 by means of a potentiometer 42 which is connected between the conductors 40 and 43, which are connected across the terminals of the glow tube 32. The grid 34c of the armature current regulating control valve 34 is connected to an intermediate point on a voltage divider which is connected between the slider 42a and the conductor 41. As a result of these connections, the armature current signal voltage is compared with the reference voltage between the conductor 40 and the slider 42a, and the difference is applied between the cathode 34b and the grid 34c of valve 34.

If the armature current decreases below the value at which it is to be held constant, the current signal voltage decreases correspondingly and the voltage of the grid 34c becomes more positive. As a result, the regulating valve 34 conducts an increased current, thereby increasing the current in the D.-C. winding of the saturable reactor 17. This reduces the reactance of the reactance winding 17a and advances the phase of the grid excitation of the armature thyratrons 6 and 7 so that the current is restored to the desired constant value. If the armature current increases above the desired constant value, the reverse action takes place. The value at which the armature current is maintained constant may be varied throughout a wide range of values between zero and rated armature current by adjustment of the position of the slider 42a.

For the purpose of varying the saturating current of the forward and reverse field saturable reactors 19 and 21, there is provided a two-stage electric valve amplifier of which the first stage comprises the valves 44 and 45 and the second stage comprises the valves 46 and 47. The first stage valves 44 and 45 are connected across the constant potential buses 43 and 48. Substantially equal voltage dropping resistors 49 and 50 are connected in the anode circuits of both valves, and a resistor of rather high ohmic value is common to the cathode circuits of both valves. This resistor is illustrated as comprising a fixed resistance portion 51 and an adjustable resistance portion 52. Preferably, the two valves 44 and 45 are matched and are contained in a single envelope. The control grid of the valve 45 is connected to the conductor 40, and the control grid of the valve 44 is connected to an intermediate point on a voltage divider comprising two resistors 53 and 54 connected in series between the slider 4a of the control rheostat 4 and the terminal 55 which constitutes one side of a source of signal control voltage.

The second stage valves 46 and 47 are respectively connected in series with the saturating windings 19b and 21b of the forward and reverse saturable reactors across the constant potential buses 43 and 40. The control grid of the valve 46 is connected to an intermediate point of a voltage divider comprising the resistors 56 and 56a which is connected between the anode 44a of valve 44 and the negative side 48 of the constant voltage source. Similarly, the control grid of the valve 47 is connected to an intermediate point of a voltage divider comprising the resistors 57 and 58 which is connected between the anode 45a of the valve 45 and the negative side of the source 48.

The rheostat 52 is adjusted so that when the slider 4a of the control rheostat 4 is in the central or zero position, both valves 44 and 45 are conducting substantially equal currents of which the value is approximately at the middle of the useful range, i. e., the linear portion of the range. Owing to the voltage drop across the resistors 49 and 50 produced by the current conducted by valves 44 and 45, the voltages applied to the control grids of the valves 46 and 47 are such that these valves conduct very small amounts of current, i. e., approximately five per cent of the amount of current required to saturate the reactors 19 and 21. This "overlap" of the valves 46 and 47 can be varied as desired by adjusting the rheostat 52. When both reactors 19 and 21 are substantially unsaturated, the grid voltages of the forward and reverse field thyratrons are retarded wtih respect to the anode voltages, and either zero current or a very small circulating current flows in the field winding thyratron circuit.

If the voltage applied to the grid of the valve 44 is made more positive with respect to the voltage of its cathode, the valve 44 conducts an increased current, and this increased current produces an increased voltage drop across the resistors 51 and 52. This increased voltage drop makes the voltage of the cathode of the valve 45 more positive with respect to the voltage of its grid than the voltage of the cathode of valve 44 is with respect to the voltage of its grid owing to the fact that the voltage of the grid of valve 45 does not change. Consequently, the current conducted by the valve 45 is decreased by substantially the same amount that the current in the valve 44 is increased. The increased current conducted by the valve 44 produces an increased voltage drop across the voltage dropping resistor 49, and this results in decreasing the voltage supplied to the grid of the valve 46. Likewise, the decreased current conducted by the valve 45 results in decreasing the voltage drop across the resistor 50, and the result of this is to increase the voltage supplied to the grid of the valve 47. The decrease in the voltage supplied to the grid of valve 46 reduces the conductivity of the valve substantially to cutoff, and the increased voltage supplied to the grid of the valve 47 causes the valve to conduct an increased amount of current, thereby increasing the saturation of the reverse field saturable reactor 21. The result is that the forward field thyratrons 10 and 11 are rendered nonconducting and the reverse field thyratrons 12 and 13 conduct an amount of current which is proportional to the positive increase in voltage applied to the grid of the valve 44.

If the voltage supplied to the grid of the valve 44 is decreased instead of increased, i. e., made more negative with respect to the voltage of its cathode, the reverse action takes place. That is to say, the conductivity of the valve 47 is reduced to cutoff, and the valve 46 conducts an increased amount of current thereby to saturate the forward reactor a corresponding amount and advance the phase of the voltage supplied to the grids of the forward field thyratrons. This causes the forward field thyratrons 10 and 11 to supply a current in the forward direction to the field winding 1b. The value of this current corresponds to the amount by which the voltage of the grid of valve 44 was made more negative with respect to the voltage of its cathode.

The characteristic which is to be maintained constant is determined by the signal voltage that is supplied between the conductor 40 and the terminal 55. For example, if it is desired to maintain the torque of the motor 1 constant, a signal voltage derived from the field current by means of a voltage dropping resistor connected in the circuit of the field winding is supplied between the conductor 40 and the terminal 55. If it is desired to maintain the horsepower output of the motor constant, a signal voltage derived from the armature voltage of the motor is supplied between the conductor 40 and the terminal 55. Likewise, if it is desired to maintain the speed of the motor constant, a signal voltage proportional to motor speed is supplied between the conductor 40 and the terminal 55.

In the modification of Figs. 1a, 1b, a voltage proportional to the speed of the motor 1 is supplied between the conductor 40 and terminal 55 by suitable means such as a tachometer generator 59 which is driven by the motor 1. The armature connections of this tachometer generator are such that if the motor 1 is rotating in the forward direction, the negative brush of the tachometer generator is connected to the conductor 40 and the positive brush is connected to the terminal 55. When the motor 1 is rotating in the reverse direction, the polarity of these brushes is reversed.

Under certain conditions of operation, it is found desirable and practical to increase the torque of the motor for short periods of time by permitting the armature current to exceed its rated value. This is particularly the case where rapid acceleration or deceleration is required. To provide this feature, electric valves 60, 61 and 62 are provided together with potentiometers 63, 64, 65 and 66 and necessary resistors. For the purpose of limiting the armature current to a predetermined maximum safe value, electric valves 67 and 68 are also provided together with a potentiometer 69 and necessary resistors.

The two valves 60 and 61 are connected in parallel with the regulating valve 34 in circuit with the saturating winding 17b of the armature saturable reactor. The grid of the valve 60 is connected to the slider 63a of rheostat 63 which is connected across the constant potential buses 43 and 48. This grid is also connected through a resistor 71 and a conductor 72 to the intermediate point of the voltage divider to which the grid of the field regulating control valve 44 is connected. The grid of the valve 61 is connected to the slider 64a of rheostat 64 which is connected between the anode of valve 62 and the negative bus 48. The grid of the valve 62 is connected to the same intermediate point of the voltage divider 53, 54 to which the grid of valve 60 is connected. The valve 62 is connected across the buses 43 and 40 and a voltage dropping resistor 73 is connected in its anode circuit. The grid bias voltages of the valves 60, 61 and 62 are so adjusted that when the motor is at rest or during normal steady-state running conditions, the valves 60 and 61 are nonconducting and the valve 62 is fully conducting, and this condition continues unless the voltage of the intermediate point 54a changes by more than the amount that is required to turn either the forward or the reverse field thyratrons full on. If the voltage of the point 54a becomes more positive than the amount required to turn the reverse field thyratrons 12 and 13 full on, the valve 60 is rendered conducting and the resulting increased current through the saturating winding 17b of the armature saturable reactor advances the phase of the grid voltage of the armature thyratrons 6 and 7, thereby increasing the current supplied to the armature of the motor. However, since the valve 62 is fully conducting, the positive increase in voltage of the point 54a does not produce any substantial change in its conductivity. The voltage drop across the resistor 73 maintains the voltage of the grid of valve 61 sufficiently negative with respect to its cathode to prevent conduction.

Likewise, if the voltage of the intermediate point 54a changes to become more negative by a greater amount than is required to turn the forward field thyratons 10 and 11 full on, the voltage of the grid of valve 62 becomes more negative with respect to the voltage of its cathode, thereby decreasing the current flow through the tube. This decreased current flow reduces the voltage drop across the resistor 73, thereby making the voltage of the grid of valve 61 more positive with respect to its cathode. As a result, the valve 61 is rendered conducting and the resulting increased current flow through the saturating winding 17b of the armature saturable reactor advances the phase of the grid voltage of the armature thyratons, thereby increasing the current supplied to the armature of the motor 1. Thus, irrespective of whether the voltage of the intermediate point 54a changes in a positive sense or in a negative sense by more than the amount required to turn either the forward or the reverse field thyratons full on, one or the other of the valves 60 or 61 is rendered conducting, thereby to advance the phase of the grid voltage of the armature thyratons and to increase the current supplied to the armature.

If during the accelerating period, the armature current should tend to become excessively high so as to endanger commutation, the current limiting valves 67 and 68 are brought into action. As the armature current increases, the armature current signal voltage increases, thereby lowering the voltage of the normally rather positive potential of the slider 69a of the rheostat 69. If the armature current increases sufficiently, the voltage of this slider which is connected to the cathodes of the diode valves 67 and 68 falls below the grid voltage of whichever of the valves 60 or 61 is conducting and producing the forcing action. This causes the one of the diode valves 67 or 68 which is connected to the grid of whichever of the forcing valves 60 or 61 is active to become conducting. This produces an increased voltage drop across either of the resistors 71 or 74, thereby lowering the grid voltage of whichever of the valves 60 or 61 is producing the forcing action. This then limits the forcing ability of the valves 60 or 61 to a value of armature current the magnitude of which is determined by the setting of the slider of the potentiometer 69.

If the motor is to be operated above its basic speed, i. e., its speed when driving rated load at rated field current, means are provided for limiting the field excitation so as to limit the armature voltage to a safe value. This means is illustrated as an electric valve 75 of the magnetron type excited by means of a potential coil 76 connected across the motor armature terminals, together with a pair of diode control valves 77 and 78 controlled by the magnetron valve 75. The anodes of the diode control valves 77 and 78 are respectively connected to the control grids of the second stage forward and reverse field control valves 46 and 47. The cathodes of the control valves 77 and 78 are connected to the slider 79a of a rheostat 79 which is connected in series with the magnetron valve across the constant potential buses 43 and 48. As long as the armature voltage of the motor is below the desired value, the ampere turns in the magnetron coil 76 are so low that the magnetron valve is fully conducting. This causes the slider 79a of the rheostat 79 and, consequently, the cathodes of the rstraining diodes 77 and 78 to be higher in potential than the control grids of the forward and reverse field control valves 46 and 47. Consequently, an inverse voltage appears across the control diode valves 77 and 78 and the normal control of the second stage control valves 46 and 47 is unaffected. However, if the armature voltage is increased in either direction, the magnetron impedance is effectively increased and the voltage drop across the magnetron is correspondingly increased. This causes the voltage of the slider 79a to decrease, i. e., become more negative until the cathode voltages of the "restraining" diode valves 77 and 78 become more negative than their anode voltages. In consequence of this the diodes 77 and 78 become conducting thereby to produce voltage drops across resistors 46a and 47a and to increase the voltage drops across the voltage dropping resistors 56 and 57. This increased voltage drop makes the grids of the second stage valves 46 and 47 more negative, thereby reducing the excitation of the field and consequently reducing the armature voltage. Whichever of the second stage triode valves 46 or 47 is conducting and producing the excessive field will feel the "restraining" effect of the diode valves first, since the voltage of its grid is more positive than the voltage of the grid of the valve which is nonconducting. One of the advantages of the use of the magnetron valve 75 in the voltage limiting circuit is that the magnetic coupling scheme insulates the control circuits from the power circuit.

In Fig. 4, the relationships between speed and torque for various armature voltages with the armature current always in the same direction and held constant at rated value are represented by curves of which ordinates represent speed and abscissae represent torque. Ordinates above the zero axis represent speed in the forward direction and ordinates below the zero axis represent speed in the reverse direction. Abscissae to the right of the zero axis represent positive torque and abscissae to the left of the zero axis represent negative torque. The curves 80, 81 and 82 in the first quadrant represent the speed-torque relationships for motoring operation in the forward direction at 100 per cent, 50 per cent, and 25 per cent armature voltages, respectively. Similarly, the curves 83, 84 and 85 in the third quadrant represent the speed-torque relationships for motoring operation in the reverse direction at 100 per cent, 50 per cent, and 25 per cent armature voltages. The curves 86, 87 and 88 in the second quadrant represent the speed-torque relationships for generating action in the forward direction at 100 per cent, 50 per cent, and 25 per cent armature voltages, respectively, and the curves 89, 90 and 91 in the fourth quadrant represent the same relationships for generating acntion in the reverse direction.

If constant rated armature current is allowed to flow and the field suitably excited so that the field flux is zero, zero torque will be produced, and if the load has no inclination to turn of its own accord, zero speed results. If the field flux is adjusted to a low positive value, a small positive torque is produced which tends to cause rotation in the forward direction until the torque of the load equals that produced by the motor. If a greater torque is desired, the field may be strengthened until the desired torque is obtained. If the motor is connected to a load device which succeeds in turning the motor in the reverse direction, it resists with a positive torque. As the direction of rotation of the armature reverses, the armature counter voltage reverses so that it has the same polarity as the voltage supplied by the armature thyratrons. As the reverse-polarity counter voltage increases, the rectifier voltage decreases to zero and increases in the reverse sense. Consequently, power is pumped back into the constant current source. Actually during this mode of operation, the motor is functioning as a generator.

If the field is excited in the reverse direction, an opposite or negative torque is produced in the motor which causes the motor to operate in the reverse direction. As shown by the curves in the second and third quadrants, it will produce torque at any speed, positive or negative, within the limitations of the motor. Thus it will be seen that such a system is capable of supplying any desired torque, positive or negative, or any speed, positive or negative, within the ratings of the thyratrons without a reversal of armature current.

With the foregoing understanding of the elements and their organization, the operation of the system will readily be understood from the following detailed description. Assuming that the slider 42a is in its zero or extreme counterclockwise position and the slider 4a is in its central or zero position, the motor 1 will be at rest with approximately zero current in the armature and in the field winding. If it is desired to operate the motor with rated armature current, the slider 42a is moved to the 100-per cent position. As a result, the valve 34 is rendered fully conducting and the phase of the grid voltage of the armature thyratrons is advanced. As the current supplied to the armature by the thyratrons increases, the current signal voltage across the conductors 40 and 41 increases, thereby rendering the voltage of the grid 34c less positive. A balanced condition is established when the armature voltage attains a value such that the difference between the reference voltage at the slider 42a and the armature current signal voltage is just sufficient to cause the armature thyratrons to conduct rated armature current. Any change in the armature current from rated value produces a change in the difference between the reference voltage and the current signal voltage of such extent as to effect the voltage of the grid 34a to restore the armature current to rated value.

To effect rotation of the motor in the forward direction, the slider 4a is moved in a counterclockwise direction from its zero position. As a result, the voltage of the grid of valve 44 is made more negative, thereby decreasing the conductivity of valve 44 and increasing the conductivity of valve 45. This results in turning on the second stage triode valve 46 and turning off the second stage triode valve 47. The phase of the grid voltage of the forward field thyratrons is thereby advanced and current is supplied to the field winding 1b of the motor in a direction to effect rotation of the motor in the forward direction.

Since the change in the voltage of the intermediate point 54a is sufficient to cause the forward field thyratron to supply full field current to the field winding 1b, it is sufficient to decrease the conductivity of the "sense" inverting valve 62, thereby rendering the forward armature forcing control valve 61 conducting. This initiates the armature current forcing action described in the foregoing. Accordingly, the initial rate of acceleration is high.

As the speed of the motor increases, the speed signal voltage of the tachometer generator 59 increases correspondingly, thereby diminishing the difference between the signal voltage and the reference voltage and making the voltage of the point 54a more positive. This results in first diminishing the forcing action of the armature thyratrons until the armature current is reduced to the value which the regulating valve 34 is set to hold, and then decreasing the current supplied by the forward field thyratrons to the field winding 1b. The acceleration of the motor continues but at a decreasing rate until at a speed corresponding to the position of the slider 4a, a balanced condition is established such that any further increase in the speed of the motor would diminish the difference between the signal and reference voltages to such an extent that deceleration of the motor would result. The motor continues to operate at this preset speed as long as the load remains constant.

If, for any reason, the load should increase substantially, the speed of the motor would decrease slightly. This decreased speed increases the difference between the signal and reference voltages and this results in increasing the current supplied to the field winding and again increasing the armature current to re-establish the forcing action. The motor accelerates until the balanced condition is re-established at a speed just enough lower than the original speed to produce sufficient difference between the signal and reference voltages to cause the forward field thyratrons to supply the additional amount of field current necessary to produce the increased torque required by the increased load.

For a decrease in load, the action is the reverse of that described in the immediate foregoing.

In the event that the load becomes overhauling, the speed of the motor rises and the voltage of the tachometer generator increases sufficiently to turn off the forward field thyratrons 10 and 11 and to turn on the reverse field thyratrons 12 and 13. This resulting reversal of the field of the motor first decreases the counter voltage of the motor and then increases it in the reverse direction. As a result, the armature current tends to increase, but this is inhibited by the action of the current regulator valve 34 which responds to the increased armature current signal voltage to retard the phase of the grid voltage of the armature thyratrons to maintain the current substantially constant. The reversal of the counter voltage of the motor, the inductance of the armature circuit and the retardation of the phase of the grid voltage combine to produce inverter operation of the armature thyratrons which produces a vigorous braking action of the motor and returns power to the source.

The speed torque relationship for the motor when under the control of the armature current and speed regulating equipment of Figs. 1a and 1b is represented graphically by the curve 92 of Fig. 5 in which ordinates represent speed and abscissae represent torque. The portion of the curve 92 at the right of the zero vertical axis represents the motoring operation and the portion at the left represents the regenerative braking operation resulting from the inverter operation in response to an overhauling load. The characteristic rises as the load is decreased, and continues to rise with increasing overhauling load in the regenerative braking quadrant. The rise is steepest at the point of crossing the zero vertical axis, i. e., the point at which the operation changes from motoring to regeneration.

In some applications this rising characteristic is undesirable. For the purpose of modifying the characteristic as desired, a feedback circuit from the voltage across the field of the motor to the grid of one of the switching valves 44 and 45 is provided. This feedback circuit comprises a resistor 93 and a capacitor 94 connected in series relationship across the field winding 1b. A potentiometer 95 is connected across the capacitor. The resistor 93 and capacitor 94 constitute a filter across the motor field so that the voltage developed across the potentiometer 95 is a relatively smooth direct voltage. Any desired portion of this voltage is then selected by movement of the slider 95a and is fed through a series resistor 96 to the grid of one or the other of the switching valves 44 or 45. Assuming that it is desired that the motor shall operate on a substantially flat speed torque characteristic such as is represented by the curve 97 in Fig. 5, the voltage derived from the potentiometer 95 is fed to the grid of the valve 45. This produces a regenerative feedback action which controls the field thyratrons further to strengthen the field in response to a tendency of the motor speed to decrease during motoring operation and also to strengthen the field in response to a tendency of the motor speed to rise during regenerative operation. As a result, the speed torque characteristic is modified in accordance with curve 97. If a more pronounced modification is desired, the slider 95a of the potentiometer 95 may be adjusted to vary the amount of the voltage fed back. Thus the characteristic may be modified so that the speed actually decreases with decreasing load in the motoring quadrant and also decreases with increasing overhauling load in the regenerated braking quadrant as represented by the curve 98 in Fig. 5. If it is desired to modify the characteristic in the opposite sense, i. e., to produce a more steeply decreasing speed with increasing load in the motoring quadrant and an increasing speed with increasing load in the regenerative quadrant, this may be accomplished by feeding back the voltage from the field of the motor to the grid of the switching valve 44. This results in a degenerative feedback and has the opposite effect on the speed torque characteristic as illustrated by the curve 99 of Fig. 5. It will be noted that the abrupt rise in the characteristic during the transition from motoring to regenerative operation which is represented between the points 92a and 92b is absent from the modified characteristics represented by the curves 97, 98 and 99. This is a very desirable feature.

If the slider 4a is suddenly moved to a lower speed position, i. e., in a clockwise direction toward the central zero position, the voltage of the intermediate point 54a becomes more positive, thereby increasing the current conducted by the first switching valve 44 and decreasing the current conducted by the second switching valve 45. This action turns the second stage reverse field valve 47 full on and turns off the second stage forward field valve 46. This results in rendering the forward field thyratron nonconducting and the reverse field thyratron fully conducting. The reversal of the field current reverses the polarity of the motor voltage so that it adds to the voltage of the armature rectifier and operates as a generator to return power to the source. Since the voltage of the point 54a is sufficiently more positive to turn the reverse field thyratrons full on, the forcing control valve 60 is rendered conducting, thereby to increase the conductivity of the armature thyratrons and to increase the armature current above the value which the regulating valve 34 is set to hold. As a result of the increased armature current and the generator operation of the motor 1 in returning power to the source, a vigorous negative torque is produced which quickly brakes the motor to the lower speed which corresponds to the new setting of the slider 4a of the potentiometer 4 without reversing the direction of the armature current. At this lower speed, the balanced condition is re-established.

If it is desired to cause the motor to rotate in the reverse direction, the slider is moved in a clockwise direction to a position on the reverse side of the potentiometer which corresponds to the desired speed in the reverse direction. The reversing operation is the same as that described in the immediate foregoing except that the balanced condition is not re-established until the reverse or negative torque produced by the reverse field has decelerated the motor to rest and accelerated it in the reverse direction to the speed corresponding to the new position of the slider 4a. This reversal or plugging operation is accomplished without reversing the direction of the armature current. During a deceleration to stand-still the motor operates as a generator returning energy to the source, thereby producing a vigorous braking torque which rapidly decelerates the motor.

In the modification of Fig. 2, the armature forcing control portion of the apparatus, i. e., the portion within the dotted rectangle 100 differs from the corresponding portion of the apparatus within the dotted rectangle 101 of the Fig. 1a, 1b modification. The main difference in the two modifications is that in the Fig. 1 modification the armature forcing control valves 60 and 61 are directly controlled in response to the voltage of the intermediate point 54a in the input circuit of the switching valves 44 and 45 which constitute the first stage of the field control amplifier, whereas in the Fig. 2 modification the corresponding armature forcing control valves 102 and 103 derive their control from the output circuits of the corresponding switching control valves 104 and 105 which constitute the first stage of the field controlled amplifier. In this connection, the grid of the forward forcing control valve 102 is directly connected to the anode circuit of the forward field control switching valve 104, and the grid of the reverse forcing control valve 103 is connected to the anode circuit of the reverse field control switching valve 105. This connection makes it possible in the Fig. 2 modification to eliminate the "phase inverting" or "sense" inverting valve 62 of Fig. 1, since in the Fig. 2 modification the function of the sense inverting valve is performed by the forward field switching valve 104. A further advantage is that the modification of Fig. 2 permits a simpler adjustment of the "forcing takeover point" owing to the amplified voltage change in the output circuit of the valves 104 and 105. Except for the performance of the functions of the sense inverting valve 62 of Fig. 1 by the valve 96, the operation of the Fig. 2 modification is essentially the same as the operation of the Fig. 1 modification.

The modification of Fig. 3 is identical with the modification of Fig. 2 with the exception that the armature current regulating control valve 106 and its associated control circuit, i. e., the armature current presetting potentiometer 107 and the voltage divider resistors 108 and 109 are omitted.

The operation is the same as the operation of the Fig. 2 modification with the slider 107a of the armature current presetting potentiometer 107 in the zero armature current position. This will readily be understood from the following explanation.

From the description of the Fig. 1 and Fig. 2 modifications it is seen that the armature forcing control feature may be used to obtain additional motor output, not only for accelerating purposes, but also to supply a sustained load which requires a torque greater than that furnished by the normal constant current limit setting at full field flux. This may require slightly greater speed regulation, since the increased armature current is available only after sufficient difference in the signal and reference voltages has been produced to produce full corrective field. However, with valve amplifying circuits very high degrees of correction for very slight errors are easily obtained. Thus the additional error is not excessive.

From a consideration of this it is evident that it is not necessary to set the slider of the constant current regulating potentiometer in the Fig. 1 and Fig. 2 modifications at full rated armature current in order to get full output of the motor. On the contrary, it may be set at the 50 per cent, 25 per cent, or 10 per cent rated armature voltage. As long as the torque required by the load is within the ability of the motor at the set armature current and full field, the field will be held at a suitable value to maintain the required torque. If more torque is required, the field will attain its full value and the armature current will then be increased by the forcing action sufficiently to produce the required torque.

Consequently, it is possible to set the constant current potentiometer slider for zero so that the armature current is controlled entirely by the "forcing" control feature. As pointed out, this is obtained simply by omitting the normal constant current regulating valve 99 and its associated control circuit entirely, thus further simplifying the equipment. An advantage of this modification is that most all of the desirable features of the Fig. 1 and Fig. 2 modifications are retained and in addition, the motor is operated with less armature current at reduced load.

The armature current limiting and armature voltage limiting features of the Fig. 3 modification are identical with the same features of the Fig. 1 and Fig. 2 modifications.

Although in accordance with the provisions of the patent statutes this invention is described as embodied in concrete form and the principle thereof has been explained together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of the invention or from the scope of the annexed claims.

What I claim as new and desire to secure by Letters Patent of the United States is:

1. A control system for an electric motor comprising electric valve means for controlling the supply of current to the armature of said motor, a source of reference voltage, means responsive to said armature current for producing a signal voltage, and means responsive to the difference of said reference voltage and said signal voltage for controlling said electric valve means to maintain said armature current substantially constant, additional electric valve means for controlling the supply of current to the field winding of said motor, and means for maintaining an operating characteristic of said motor substantially constant at a predetermined value comprising a second source of reference voltage, means responsive to said operating characteristic of said motor for producing a second signal voltage and means responsive to a change in the difference of said second reference voltage and said second signal voltage for controlling said additional electric valve means to counteract said change.

2. A control system for an electric motor comprising electric valve means for controlling the supply of current to the armature of an electric motor, a source of adjustable reference voltage, means responsive to the armature current for producing a signal voltage proportional to armature current, means responsive to the difference of said signal voltage and reference voltage for controlling said electric valve means to maintain said armature current substantially constant at a predetermined value that is dependent upon the magnitude of said reference voltage, a second electric valve means for controlling the supply of current to the field winding of the motor in one direction, a third electric valve means for controlling the supply of reverse current to said field winding, a second adjustable source of reference voltage for selectively controlling said second and third electric valve means, means for producing a second signal voltage proportional to the magnitude of an operating characteristic of said motor for cooperating with said second reference voltage to control said second and third electric valve means selectively to maintain said operating characteristic substantially constant at a value corresponding to the magnitude of said second reference voltage.

3. A control apparatus for an electric motor comprising electric valve means for controlling the supply of current to the armature, regulating means responsive to variations of the armature current from a predetermined value for controlling said electric valve means to maintain said armature current substantially constant at a predetermined value, a second electric valve means for controlling the supply of current in one direction to the field winding of the motor, a third electric valve means for controlling the supply of reverse current to the field winding, a source of adjustable reference voltage for presetting the speed and direction of rotation of the motor, means for producing a signal voltage proportional to the speed of the motor, and means responsive to the magnitude of said reference voltage for selectively energizing said second and third valve means and responsive to the difference of said signal and reference voltages for controlling the energized valve means to maintain the speed of the motor substantially constant at a value corresponding to the magnitude of said reference voltage.

4. A control apparatus for an electric motor comprising electric valve means for controlling the supply of current to the armature of the motor, regulating means responsive to variations in the armature current for controlling said electric valve means to maintain said current substantially constant at a predetermined value, a second electric valve means for controlling the supply of current to the field winding of the motor, a source of reference voltage, means for producing a signal voltage proportional to the speed of the motor, means responsive to the difference of said signal and reference voltages for controlling said second electric valve means to change the speed of said motor to a speed corresponding to the magnitude of said reference voltage, and additional electric valve means responsive to a predetermined difference of said signal and reference voltages for rendering said armature current regulating means temporarily inactive and controlling said first electric valve means to increase said armature current substantially above said predetermined value of armature current thereby to force said speed change.

5. Control apparatus for an electric motor comprising electric valve apparatus for controlling the supply of current to the armature of the motor, regulating means responsive to variations of the armature current from a predetermined value for controlling said electric valve means to maintain said current substantially constant at said predetermined value, a second electric valve means for controlling the supply of current to the field winding of the motor, a source of adjustable reference voltage, a tachometer generator driven by the motor for producing a signal voltage proportional to motor speed, means responsive to the difference of said reference and signal voltages for controlling said second valve means to effect a change in the speed of said motor, electric valve means connected to by-pass said regulating means and responsive to a predetermined change in said reference voltage for controlling said first valve means to increase said armature current above said predetermined value to force said speed change, and additional electric valve means responsive to said armature current for controlling said by-passing means to limit said armature to a value substantially in excess of said predetermined value of armature current.

6. Control apparatus for an electrical motor comprising electric valve apparatus for controlling the supply of current to the armature of the motor, regulating means responsive to variations of the armature current from a predetermined value for controlling said electric valve means to maintain said current substantially constant at said predetermined value, a second electric valve means for controlling the supply of current to the field winding of the motor, a third electric valve means for controlling the supply of a reverse current to said field winding, a source of adjustable reference voltage, means for producing a signal voltage proportional to the speed of the motor, means responsive to the magnitude of said reference voltage for selectively energizing said second and third valve means to determine the direction of rotation of said motor and responsive to a predetermined change in the difference of said reference voltage and signal voltage for controlling said second and third valve means to effect a change in the speed of said motor, a pair of electric valves selectively energized in response to the magnitude of said reference voltage and responsive to a predetermined difference of said reference voltage and signal voltage to control said first valve means to increase said armature current above said predetermined value to force the speed change of the motor, and means responsive to said armature current for controlling said pair of electric valves to limit said armature current to a value substantially in excess of said predetermined value of armature current.

7. Control apparatus for an electric motor comprising electric valve apparatus for controlling the supply of current to the armature of the motor, regulating means responsive to variations of the armature current from a predetermined value for controlling said electric valve means to maintain said current substantially constant at said predetermined value, a second electric valve means for controlling the supply of current to the field winding of the motor, a source of adjustable reference voltage, means for producing a signal voltage proportional to the speed of said motor, means responsive to the difference of said reference voltage and signal voltage for controlling said second valve means to effect a change in the speed of the motor, a first control electric valve having an input circuit including a control grid connected to be responsive to the difference of said reference voltage and said signal voltage and having an output circuit connected to control said first electric valve means to increase said armature to force said speed change in response to a difference of said reference and signal voltages of a predetermined value, and an additional control electric valve responsive to said armature current and connected to said control grid for controlling said first control valve to limit said armature current to a value substantially in excess of said predetermined value of armature current.

8. Control apparatus for an electric motor comprising electric valve means for controlling the supply of current to the armature of the motor, regulating means responsive to variations in the armature current from a predetermined value for controlling said electric valve means to maintain said armature current substantially constant, a second electric valve means for controlling the supply of current to the field winding of the motor, a source of adjustable reference voltage, means for producing a signal voltage proportional to the speed of the motor, means responsive to the difference of said reference and signal voltages for controlling said second electric valve means to effect a change in the speed of the motor, electric valve means connected to by-pass said regulating means and responsive to a predetermined change in the difference of said reference voltage and signal voltage to control said first valve means to increase said armature to force said speed change, and means responsive to the voltage supplied to the armature of said motor for controlling one of said electric valve means to limit the armature voltage to a predetermined value.

9. Control apparatus for an electric motor comprising electric valve means for controlling the supply of current to the armature of the motor, regulating means responsive to variations in the armature current from a predetermined value for controlling said electric valve means to maintain said armature current substantially constant, a source of adjustable reference voltage, means for producing a signal voltage proportional to the speed of the motor, a second electric valve means having an input circuit connected to be responsive to the difference of said reference and signal voltages and an output circuit for controlling the supply of current to the field winding of the motor, electric valve means responsive to a predetermined change in the difference of said reference voltage and signal voltage to supersede said regulating means and control said first valve means to increase the current supplied to said armature above said predetermined value, and electric valve means connected to said input circuit and connected to be responsive to the voltage supplied to said armature for controlling said second electric valve means to limit said voltage to a predetermined value.

10. Control apparatus for an electric motor comprising a first electric valve means for controlling the supply of current to the armature of the motor, a source of adjustable reference voltage, means for producing a signal voltage, a second electric valve means for controlling the supply of current to the field winding of the motor, a third electric valve means for controlling the supply of reverse current to the field winding, means controlled by said reference voltage for selectively energizing said second and third electric valve means and responsive to the difference of said signal and reference voltages for controlling the energized valve means to vary the torque of the motor, and additional electric valve means responsive to a predetermined difference of said reference and signal voltages for controlling said first valve means to vary the current supplied to the armature of the motor.

11. Control apparatus for an electric motor comprising a first electric valve means for controlling the supply of current to the armature of the motor, a source of adjustable reference voltage, means for producing a signal voltage, a second electric valve means for controlling the supply of current to the field winding of the motor, a third electric valve means for controlling the supply of a reverse current to the field winding, a pair of switching electric valves selectively controlled in response to said reference voltage for selectively energizing said second and third valve means and responsive to the difference of said reference and signal voltages for controlling the selected valve means to vary the field current, a pair of control electric valves selectively controlled in response to said reference voltage and responsive to the difference of said reference and signal voltages for controlling said first electric valve means to vary the armature current supplied to said motor.

12. A control apparatus for an electric motor comprising an electric valve rectifier for controlling the supply of current to the armature of the motor, a source of adjustable reference voltage, means for producing a signal voltage, electric valve means for controlling the supply of current to the field winding of the motor, a second electric valve, means for controlling the supply of a reverse current to the field winding, a pair of switching electric valves oppositely responsive to said reference voltage for selectively energizing said first and second valve means selectively to control the direction of the torque of the motor and responsive to the difference of said reference and signal voltages to vary the magnitude of the torque, and a pair of control electric valves selectively controlled in response to the polarity of the difference of said reference and signal voltages and responsive to the magnitude of said difference voltage for varying the conductivity of said rectifier.

13. A control apparatus for an electric motor comprising an electric valve rectifier for controlling the supply of current to the armature of the motor, a source of adjustable reference voltage, means for producing a signal voltage, electric valve means for controlling the supply of current to the field winding of the motor, a second electric valve means for controlling the supply of a reverse current to the field winding, a pair of switching electric valves oppositely responsive to said reference voltage for selectively energizing said first and second valve means selectively to control the direction of the torque of the motor and responsive to the difference of said reference and signal voltages to vary the magnitude of the torque, a pair of control electric valves selectively controlled in response to the polarity of the difference of said reference and signal voltages and responsive to the magnitude of said difference voltage for varying the conductivity of said rectifier, means responsive to the current supplied to the armature for controlling said control valves to limit said current to a predetermined value.

14. Control apparatus for an electric motor comprising an electric valve rectifier provided with a control electrode for controlling the supply of current to the armature of the motor, a source of adjustable reference voltage, means for producing a signal voltage, a first electric valve means for controlling the supply of current to the field winding of the motor, a second electric valve means for controlling the supply of a reverse current to the field of the motor, a pair of switching electric valves oppositely responsive to the polarity of the difference of said reference and signal voltages for selectively energizing said first and second valve means to determine the direction of the torque of the motor and responsive to the magnitude of said difference voltage for varying the conductivity of the energized valve means to vary the torque, a first control electric valve responsive to one polarity of said reference voltage for varying the conductivity of said rectifier in accordance with the magnitude of said difference voltage, a sense inverter valve responsive to the opposite polarity of said difference voltage and a second control valve controlled thereby for controlling the conductivity of said rectifier.

15. Control apparatus for an electric motor comprising an electric valve rectifier for controlling the supply of current to the armature of the motor, a source of adjustable reference voltage, means for producing a signal voltage, a first electric valve means for controlling the supply of current to the field winding, a second electric valve means for controlling the supply of a reverse current to the field winding, a pair of switching electric valves oppositely responsive to the polarity of the difference of said reference and signal voltages for selectively energizing said first and second electric valve means and responsive to the magnitude of said difference voltage for controlling the energized valve means to vary the current supplied to the field of the motor, and a pair of control electric valves selectively controlled by said switching valves for controlling said rectifier to vary the current supplied to the armature of the motor.

16. Control apparatus for an electric motor comprising an electric valve rectifier for controlling the supply of current to the armature of the motor, a source of adjustable reference voltage, means for producing a signal voltage, a first electric valve means for controlling the supply of current to the field winding, a second electric valve means for controlling the supply of a reverse current to the field winding, a pair of switching electric valves oppositely responsive to the polarity of the difference of said reference and signal voltages for selectively energizing said first and second electric valve means and responsive to the magnitude of said difference voltage for controlling the energized valve means to vary the current supplied to the field of the motor, a pair of control electric valves selectively controlled by said switching valves for controlling said rectifier to vary the current supplied to the armature of the motor, and means responsive to the armature current for controlling said rectifier to limit the armature current to a predetermined value.

17. Control apparatus for an electric motor comprising an electric valve rectifier for controlling the supply of current to the armature of the motor, a source of adjustable reference voltage, means for producing a signal voltage, a first electric valve means for controlling the supply of current to the field winding, a second electric valve means for controlling the supply of a reverse current to the field winding, a pair of switching electric valves oppositely responsive to the polarity of the difference of said reference and signal voltages for selectively energizing said first and second electric valve means and responsive to the magnitude of said difference voltage for controlling the energized valve means to vary the current supplied to the field of the motor, a pair of control electric valves selectively controlled by said switching valves for controlling said rectifier to vary the current supplied to the armature of the motor, means responsive to the armature current for controlling said rectifier to limit the armature current to a predetermined value, and means responsive to the voltage supplied to the armature for controlling said first and second electric valve means to limit the armature voltage to a predetermined value.

18. Control apparatus for an electric motor subject to overhauling loads comprising an electric valve rectifier for controlling the supply of current to the armature of the motor, a source of adjustable reference voltage, a tachometer generator driven by the motor for producing a signal voltage varying with the speed of the motor, a first electric valve means for controlling the supply of current to the field winding, a second electric valve means for controlling the supply of reverse current to the field winding, means responsive to the polarity of the difference of said signal and reference voltages for energizing said first valve means to cause said motor to produce a motoring torque and responsive to a reversal of said polarity in response to an overhauling load for deenergizing said first valve means and energizing said second valve means to cause said motor to develop a braking torque, a pair of control electric valves selectively controlled in response to the polarity of said difference voltage and responsive to the magnitude of said difference voltage for controlling said rectifier, and means responsive to said armature current for controlling said rectifier to limit said current.

19. A control apparatus for an electric motor comprising means for controlling the supply of current to the armature of the motor, regulating means responsive to variations in the armature current for controlling said supply means to maintain said current substantially constant at a predetermined value, a source of reference voltage, means for producing a signal voltage proportional to the speed of the motor, means for controlling the supply of current to the field winding of the motor comprising electric valve means provided with an input control circuit connected to be responsive to the difference of said voltages to maintain the speed of said motor substantially at a value corresponding to the magnitude of said reference voltage and an electrical feedback circuit from said field winding to said input circuit for controlling the operation of said electric valve means to modify the speed torque characteristic of said motor.

20. Control apparatus for an electric motor comprising means for controlling the supply of current to the armature of the motor, a source of adjustable reference voltage, means for producing a signal voltage, means for varying the torque of the motor comprising electric valve means provided with an output circuit connected to said field winding and a control grid circuit connected to be responsive to the difference of said signal and reference voltages, and an electrical feedback circuit from said field winding to said control grid circuit for modifying said variation in torque comprising electrical conductors from said field winding to said input circuit for supplying a voltage to said input circuit proportional to the voltage across said field winding.

21. A control apparatus for an electric motor comprising an electric valve rectifier for controlling the supply of current to the armature of the motor, a source of adjustable reference voltage, means for producing a signal voltage, electric valve means for controlling the supply of current to the field winding of the motor, a second electric valve, means for controlling the supply of a reverse current to the field winding, a pair of switching electric valves oppositely responsive to said reference voltage for selectively energizing said first and second valve means selectively to control the direction of the torque of the motor and responsive to the difference of said reference and signal voltages to vary the magnitude of the torque, said switching valves having input and output circuits an electrical feedback circuit from said field winding to one of said switching valves for modifying the speed torque characteristic of the motor comprising electrical connections from said field winding to said input circuit for supplying to said input circuit a voltage proportional to the voltage across said field winding, and a pair of control electric valves selectively controlled in response to the polarity of the difference of said reference and signal voltages and responsive to the magnitude of said difference voltage for varying the conductivity of said rectifier.

22. A control system for an electric motor comprising electric valve means for controlling the supply of current to the armature, means responsive to variations from a predetermined value in the armature current of said machine for controlling said electric valve means to restore said armature current to said predetermined value, means for maintaining an operating characteristic of said motor substantially constant at a predetermined value comprising a source of reference voltage, means responsive to said operating characteristic of said motor for producing a signal voltage, additional electric valve means provided the input and output circuits responsive to a change in the difference of said reference voltage and signal voltages for controlling the supply of current to the field winding of said motor, and an electrical feedback circuit from said field winding to said additional electric valve means for modifying said operating characteristic comprising a potentiometer connected across said field winding for deriving a portion of the voltage across said winding and electrical connections from said potentiometer to said input circuit for supplying said derived portion of said voltage thereto.

ORRIN W. LIVINGSTON.

REFERENCES CITED

The following references are of record in the file of this patent:

UNITED STATES PATENTS

| Number | Name | Date |
| --- | --- | --- |
| 2,400,599 | Reeves | May 21, 1946 |